Inventors:
Victor H. Fraenckel,
Lewis R. Koller,
by Paul A. Frank
Their Attorney.

Patented July 8, 1952

2,602,900

UNITED STATES PATENT OFFICE 2,602,900

LUMINESCENT SCREEN

Victor H. Fraenckel, Scotia, and Lewis R. Koller, Schenectady, N. Y., assignors to General Electric Company, a corporation of New York Application November 22, 1950, Serial No. 197,106

3 Claims. (Cl. 250—80)

This invention relates to luminescent screens. More particularly, it relates to luminescent screens which are characterized by decreased halation when excited.

It is common practice in the manufacture of cathode ray tubes to form the luminescent screen directly upon and in contact with the glass viewing surface of the tube as by liquid settling means. This process is time consuming, entails the use of complicated equipment, and requires constant supervision and maintenance. Such screens, even once constructed and at their best, are subject to certain disadvantages. First, there is a pronounced tendency toward halation under excitation. When a cathode ray or electron beam strikes the inner surface of such a luminescent screen a bright spot of light is produced. Surrounding this spot is a larger, radially extending, and more faintly lighted region with a characteristic pattern of halos which detracts from the sharpness of the excited area. While this halo lessens the usefulness of any cathode ray tube, it is especially disadvantageous in the case of television viewing tubes where the halation produces a relatively indistinct image and a hazy or poor contrast between various parts of the image and between the image and the background. This halation effect is attributed primarily to light scattering. When an electron beam strikes the phosphor screen, a major portion of the light produced passes directly through the screen and its supporting glass base to the eye of the viewer, but a certain amount of the light is scattered within the phosphor layer, particularly if the latter is a number of particles thick, and results in poor resolution. A portion of the light also proceeds through the phosphor layer but is reflected at various angles from the near and far surfaces of the glass viewing face back into the phosphor layer. This also produces a light effect in areas of the screen which are not deliberately excited. Room light also passes inwardly through the viewing face and is scattered among the luminescent particles resulting in a loss of contrast in the screen.

An object of the present invention is to provide a luminescent screen which is characterized by a reduced halation effect.

Another object of the invention is to provide a luminescent screen for cathode ray tubes which is capable of producing an enhanced contrast and sharpness of image.

A further object of this invention is to provide a luminescent screen for cathode ray tubes which is independent of or spaced from the viewing face of the tube.

Figure 1:
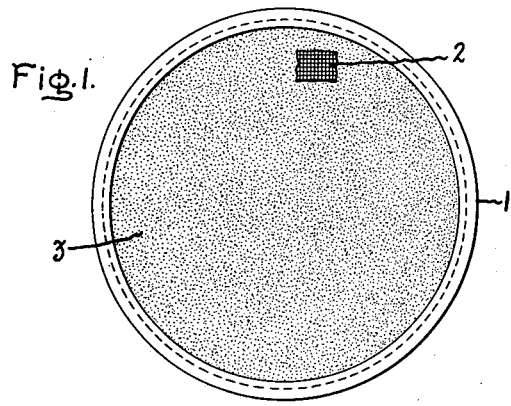
Figure 2:
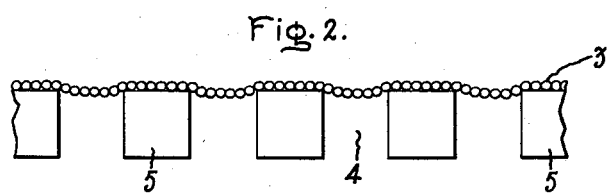
Figure 3:
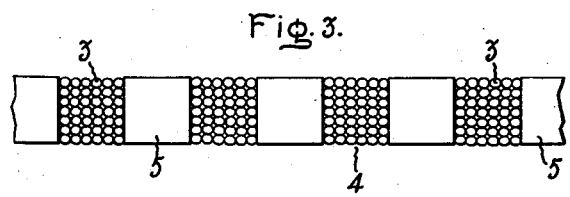
Figure 4:
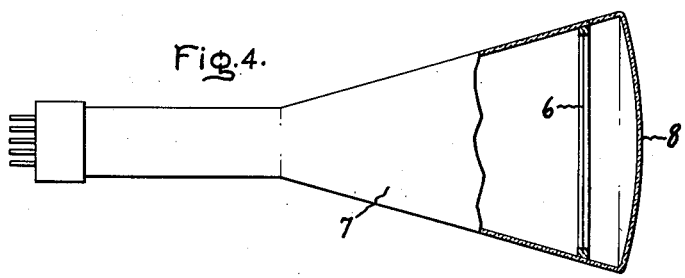

Other objects will become apparent and the invention better understood from a consideration of the following description and the drawing in which Fig. 1 shows a plan view of an improved luminescent screen; Fig. 2 is a greatly enlarged cross-sectional view of a portion of the screen; Fig. 3 is an enlarged cross-sectional view of a modification of our luminescent screen; and Fig. 4 is a conventional view of a cathode ray tube, partially in cross-section, showing the improved screen in place.

It has been found that a luminescent screen which exhibits a reduced halation effect under excitation may be very readily prepared. More particularly, it has been found that such a luminescent screen may be made by forming a layer of phosphor particles on or in a fine mesh metal screen. Preferably the metal screen should be of non-corrosive material and have from 300 to 500 openings or mesh per inch with the openings in the screen comprising about 50% or more of the total screen area.

A preferred type of metal screen used is one formed by the electrodeposition of metal on a suitably prepared base or master as described, for example, in "The Review of Scientific Instruments," volume 19, No. 12, December 1948, pages 879–881. The size and number of mesh in such screens may be controlled within very close limits and prepared in extremely fine sizes within the above range with 50% or more open area. While ordinary woven screens of suitably fine sizes may be employed, their relatively low proportion of open area detracts from the effective area of the luminescent portion of the screen and from any image produced thereon. Additionally, whereas ordinary screens are characterized by an unevenness due to their woven structure, electrodeposited screens present an essentially plane surface upon which luminescent materials may more readily be deposited. Likewise, while screens up to 1500 mesh per inch, having about 50% or more open area, can be used, those having a mesh of 300 to 500 are preferred for their mechanical strength.

The screen of any desired shape is mounted in a metal frame and heat treated to tauten the mesh structure. The frame may conveniently be in the form of a copper or nickel split ring, such as that shown at 1, in which mesh 2 is mounted. Other modes of mounting the screen will occur to those skilled in the art.

While luminescent material particles or crystals of any size may be utilized in connection with this invention, it is preferred that they average under 6 microns in size. Furthermore, in order to still further reduce the scattering of light particles, the phosphor layer, when mounted on the screen, may be made only one particle thick. The formation of mono-particle thick phosphor layers is described in copending application Serial No. 172,449, Lewis R. Koller, filed July 7, 1950, and assigned to the same assignee as this invention. In this method, mono-particle thick layers of luminescent material are deposited on a water or other liquid surface and the base, in this case a screen, passed upward through the layer, the latter being transferred to the surface of the base and dried. It has been found that the cohesive forces between the particles are sufficient to permit them to bridge the spaces in the screen with little or no buckling, as shown in Fig. 2, wherein 3 is the mono-particle layer of phosphor material bridging the open spaces 4, and 5 represents strands of the screen structure. While phosphor layers of any thickness may be utilized, when using a mono-particle thick layer of luminescent material much of the scattering of light, which is normally present in multiple particle thick layers, is absent. Furthermore, the tendency of the mono-particle thick layer to sag between the cross pieces of the wire mesh, as shown in Fig. 2, reduces lateral scattering within the layer due to the blocking action of the metal screen structure.

If desired, the entire volume of the mesh interstices may be filled with luminescent material particles 3 to obtain a screen such as that shown in Fig. 3. Here, while scattering of light takes place between particles in the phosphor mass within each screen mesh, it cannot spread from mesh to mesh because of the metal partition, wire, or strand and is strictly confined. Alternatively, of course, the mesh may be filled with a phosphor and a mono-particle or multi-layer of phosphor also formed on the surface.

In Fig. 4 there is illustrated a typical application of the improved luminescent screen. The complete screen structure 6 is mounted at any desired location within cathode-ray tube 7 and in spaced relation with the viewing face 8.

Since the luminescent screen is independent of the viewing face, halation effects, as well as light scattering and reflection within the face and phosphor layer, are considerably reduced and the cathode ray spot or image is relatively sharp and distinct with little or no halo. Particularly in the case where the phosphor particles are within the interstices or mesh of the metal screen, scattering within the phosphor itself is greatly reduced since it is divided up into a myriad of discrete masses separated by the metal screen structure.

While this invention has been described with relation to cathode ray tubes, it will be understood that the luminescent screen disclosed herein may be used in any application where such a screen is indicated.

What we claim as new and desire to secure by Letters Patent of the United States is:

1. A luminescent screen structure comprising a screen of electrodeposited metal having luminescent material disposed between the strands thereof.

2. A luminescent screen structure comprising a screen of electrodeposited metal having luminescent material disposed thereon.

3. In a cathode ray tube, a luminescent screen structure comprising a screen of electrodeposited metal having luminescent material disposed between the wires thereof, said structure being spaced from the viewing face of said tube.

VICTOR H. FRAENCKEL.
LEWIS R. KOLLER.

REFERENCES CITED

The following references are of record in the file of this patent:

UNITED STATES PATENTS

| Number | Name | Date |
| --- | --- | --- |
| 2,124,224 | Batchelor | July 19, 1938 |
| 2,125,599 | Batchelor | Aug. 2, 1938 |
| 2,215,199 | Steudel | Sept. 17, 1940 |
| 2,307,188 | Bedford | Jan. 5, 1943 |
| 2,416,056 | Kallmann | Feb. 18, 1947 |
| 2,461,515 | Bronwell | Feb. 15, 1949 |
| 2,546,828 | Levy | Mar. 27, 1951 |